United States Patent Office 3,193,402
Patented July 6, 1965

3,193,402
REFRACTORY COMPOSITION FOR
REPAIRING FURNACES
Samuel Rusoff and Vaughn V. Hughey, Tiffin, Ohio,
assignors to Basic Incorporated, Cleveland, Ohio, a
corporation of Ohio
No Drawing. Filed Dec. 21, 1961, Ser. No. 161,253
11 Claims. (Cl. 106—58)

The present invention relates to a novel composition of matter and, more particularly, to a refractory composition particularly useful for repairing the linings of steel-making furnaces and the like.

The constant demand in the steel industry for increased production rates and increased efficiencies has brought about the development of the top-blown basic oxygen converter of steel manufacture. High production rates are characteristic of this process and are obtained by the utilization of large quantities of pure oxygen which develop extremely high reaction temperatures along with violent turbulence of molten metal and slag within a vessel, a combination which accelerates the steel refining process and greatly reduces the time necessary for the production of the steel. However, the high temperatures and turbulence cause rapid erosion of the refractory linings of the converters. This requires either frequent replacement or repair of the linings. With the unusual conditions prevailing in such furnaces, unique refractory repair materials are required.

The steel shell of most of the oxygen-blown converter vessels consists of a central cylindrical section fitted with a bottom of spherical section and a top of a truncated conical section. An opening is provided in the top section for the introduction of the molten metal-steel scrap charge, fluxing agents, and subsequently a water-cooled pipe or lance for injecting oxygen onto the charge. The shell is lined with special refractory materials which may be in the form of brick or a plastic mass which can be rammed in place with pneumatic equipment. Special refractories have been formulated to withstand the high reaction temperatures and the extreme turbulence created between the molten unrefined metal, the slag, and the pure oxygen gas blown at high velocity into the furnace during the refining process. Chief among these refractories are the dead-burned dolomite brick which are bonded with a carbonaceous material, such as coal tar pitch; brick pressed from tar-bonded stabilized dead-burned dolomite; or pitch-bonded dead-burned magnesite brick formulated with or without varying portions of dead-burned dolomite. These refractories, when first placed into the oxygen vessel are "burned-in" or "coked" to cause pyrolytic decomposition or "cracking" with the consequent development of a carbon bond which surrounds the dead-burned dolomite, dead-burned magnesite or other refractory particles and holds them in place. The linings of this carbon-bonded, basic refractory composition are subjected to wear and erosion which can average from 10 to 50 pounds, or even more, of refractory lining per ton of steel produced. This consumption of the refractory lining, however, is not of a uniform nature with certain areas being more critically eroded than others. Sections such as the conical upper portion of the vessel, or the nose area near the tap hole, or the area at the trunnion ring level of the furnace, or that portion of the vessel lining upon which the falling steel scrap impinges when the vessel is being charged are typical examples of troublesome areas. These critical areas which are eroded and consumed at a more rapid rate than the remaining refractory lining substantially reduce the total number of steel-producing heats for a given lining. The overall life of the lining, however, can be prolonged by the application of a compatible repair material to these eroded areas.

The present invention relates to a refractory material possessing the desirable properties of plasticity, cohesion, and stability at high temperatures under turbulent conditions for the repair of surfaces and linings of metallurgical apparatus, furnaces, and the like which are desirably constructed of basic materials; and to the renewing of such surfaces from time to time, even while such furnaces are hot, thus increasing furnace life and efficiency. It also relates to a refractory material which can easily be applied to such furnaces by pneumatic techniques hereinafter referred to as "gunning." Such techniques and apparatus involved are described in the Matirko U.S. Patents No. 2,615,693 and No. 2,671,692; and in the Boatright et al. Patents No. 2,879,923 and No. 2,881,943. Application of the refractory material can also be made merely by ramming or shoveling the material into place.

There are many serious difficulties to be met in making repairs of basic refractory installations. Repairs frequently must be made with the furnace at high temperatures, for example, in excess of 3000° F., and the repair refractory must under such conditions adhere without being dispersed into the atmosphere, or without bouncing off the damaged area of the lining and falling into the metal bath. Further, the repair-material must, in all cases, be retained in position without popping or scaling during extremely rapid temperature changes, and it must be compatible with the basic furnace linings and with any slags which may be present in the area under repair.

The usual refractory repair materials that are employed for the repair of metallurgical apparatus, furnaces, and the like, have been similarly applied to the repair of oxygen furnace linings without any appreciable success.

One widely used open-hearth gun refractory material is composed essentially of chrome ore and dead-burned magnesite along with a small amount of sodium silicate. This material is tempered with water and pneumatically applied to the damaged furnace lining. The use of this type refractory material, however, is not effective as a repair material for oxygen converter linings.

Still another example of a gun refractory material finding extensive use as a basic furnace lining repair material is composed almost entirely of dead-burned magnesite with a small amount of sodium silicate as a bonding material and a plasticizing agent such as hectorite, ball clay, etc. Difficulties with adhesion and cohesion have been experienced with this gun material preventing its use as an efficient oxygen-blown converter lining repair material.

Certain "dry" formulations containing coal tar pitch, that is, formulations without the use of tempering water, have been tried as repair materials. However, when pneumatically propelled, these "dry" mixes have not only shown poor adhesive and weak bonding qualities, but they have also had the undesirable property of "flaming," that is, igniting as they are shot or thrown through the hot atmosphere of a vessel undergoing repair, thereby badly obstructing the operator's vision and generally resulting in poorly directed repair work.

The principal object of the present invention is, therefore, to provide a novel composition of matter adapted for the purposes indicated.

Another object is to provide a particulate refractory composition for the repair of furnace linings and the like.

A further object is to provide a refractory admixture that may be tempered with water and applied to a point of use such as a furnace lining, including a furnace lining still hot from use, by pneumatic or other means.

A still further object is to provide a refractory mix for repairing the lining of a furnace and the like, and especially an oxygen-converter type of furnace, that adheres well to a furnace lining, is substantially free of scaling and compatible with such a lining, and has still other desirable physical properties.

Other objects of the invention will become apparent as the description proceeds.

To the accomplishment of the foregoing and related ends, the invention consists of the features hereinafter fully described and particularly pointed out in the claims, the following disclosure describing in detail the invention, such disclosure illustrating, however, but one or more of the various ways in which the invention may be practiced.

In accordance with the present invention, an improved material for the purposes indicated includes a composition of matter comprising in admixture dead-burned refractory particles, a chemical bonding material adapted to bond such particles, and granules of a carbonaceous material susceptible to pyrolytic decomposition. Preferably the admixture also includes a gel-forming plasticizing agent. The admixture is tempered with water in application to a point of use.

The dead-burned refractory particles are normally either dead-burned dolomite or dead-burned magnesite or mixtures thereof in any proportion. The size of the particles is not critical to practicing the invention. Generally, however, the particles have a mesh size within the range of about minus 6 to about plus 100. Mesh sizes stated here and in the claims are U.S. standard sieve. Preferably the dead-burned particles comprise a mixture of particles within different or overlapping size ranges. As an example, one typical set of ranges of mesh sizes for the dead-burned refractory particles comprises by weight a combination of 51 percent minus 12 to plus 20 mesh, 25 percent minus 20 to plus 100 mesh, and 24 percent minus 100 mesh. In another example, the dead-burned refractory particle portion was composed entirely of minus 14 mesh dead-burned magnesite. In another typical blend of sizes, the refractory particles comprised in weight percent the combination of 65 percent minus 6 mesh dead-burned dolomite grains, and 35 percent of dead-burned magnesia ground to pass a 50 mesh sieve. Thus the gunning refractory, that is, a refractory mix which may be pneumatically applied through a "gun" may comprise various blends of different refractory granules.

A plasticizing agent as hereinafter described does not contribute significantly to the bonding of the refractory mixture after it has been applied and dried at the high temperature of an oxygen-blown vessel. A chemical bonding material is accordingly added for the development of a chemical bond at such a time. By the term "chemical bonding material" is meant a material which chemically reacts with the refractory to produce a bond. The chemical bonding material may be a water-soluble alkali silicate which remains effective even at elevated temperatures, for example above 1400° F., to bond the dead-burned particles together. Such silicates may include sodium silicate and potassium silicate. Sodium silicate is preferred. The sodium silicate which seems most desirable has a weight ratio of 1:3.2 $Na_2O$ to $SiO_2$, but the ratio can vary between 1:2 to 1:3.5, respectively. Either the readily water-soluble hydrous or the anhydrous sodium silicates with other bonding substances may be incorporated into the granular refractory fines.

Since the basic refractory mixes do not inherently have the necessary adhesive properties to stick when propelled against a wall, and since they do not have cohesive properties within the mix necessary to form an integrated mass, various agents may be further incorporated in the refractory formulation to impart the necessary plasticity to the refractory mixture when moistened with water and particularly when shot against a vessel wall being repaired. To achieve the necessary conditions of plasticity, adhesiveness and cohesiveness, a gel-forming plasticizing agent or material which absorbs water with rapidity and swells to an enlarged volume may be added to the refractory formulation. Such agents include hectorite, bentonite, ball clay, and kaolin. Hectorite is hydrous magnesium silicate such as is described in U.S. Patent No. 2,406,909 which is hereby incorporated by reference. The desirable physical properties may also be imparted by the addition of wholly organic ingredients such as carboxymethyl cellulose, carboxyethyl cellulose, hydroxypropyl cellulose, or the sodium salts of these modified celluloses. The amount of the gel-forming plasticizing agent that is necessary can be easily determined by trial and error. Ordinarily, any amount added performs some benefit. Normally the amount of the gel-forming plasticizing agent ranges from about 0.05 to about 4 percent by weight of the mixture.

The improved results of the present refractory mix is due primarily to the incorporation of a granular carbonaceous material susceptible to pyrolytic decomposition or "cracking" when heated to deposit a carbon residue as a bond. Such a material serves a two-fold purpose. Not only does it pyrolytically decompose under the high temperatures of application as indicated and form a protective carbon bond, but its adhesive pasticizing properties prior to such decomposition enables the entire refractory mix to be handled more easily and especially to be pneumatically deposited along a furnace lining without splattering and the like. Further, there is a permissible delay in the chemical bonding reaction provided by a temporary action of the molten pitch after the emplacement or deposition of the refractory mixture at a point of use. The molten pitch serves to hold the refractory mix in place against, for example, a furnace lining, while the chemical bonding material along with any water vapor that may be present, as from the vaporized tempering water, is reacting with the magnesium oxide and/or calcium oxide in the refractory to form a chemical bond.

Thus, both the molten pitch and the carbon bond, which results from the pyrolytic decomposition of the pitch, aid in making the refractory mix adhere to a furnace lining during the relatively short period in which the chemical bonding agent is reacting with the refractory materials to form the chemical bond. It is postulated that the burning of the volatile hydrocarbon gases given off during the decomposition of the pitch raises the temperature of the refractory mixture to a certain extent and thereby accelerates the chemical reaction between the bonding agent and the refractory material.

Normally, when shooting a refractory through a gun as practiced in the art, only a small amount of the tempering water used actually reacts with the chemically bonding material employed to effect a bond with the refractory material. In part, the remaining water assists the bonding action, forming a film between the refractory wall and the unplaced material. A heating of the mass, through the pyrolytic decomposition of the coal tar pitch as described, also facilitates hydration of the chemically bonding material by the water vapor present, and this in turn promotes the reaction of such material with the refractory particles.

Preferably the carbonaceous material is a pitch such as a coal tar pitch. A high melting coal tar pitch has been found to be preferable. However, a coal tar pitch having a softening point within the range of about 80° C. to about 150° C. may be used. Preferably the softening point is within the range of about 100° C. to about 150° C. Usually such coal tar pitches undergo pyrolytic decomposition at temperatures of about 1600° F. and higher.

The granules of carbonaceous material may also vary considerably in size, from about minus 14 mesh to about plus 200 mesh being an exemplary range. As a rule, the granules are of a size for all to pass about 14 mesh, and for about 50 percent to about 65 percent by weight of the granules to pass about 200 mesh. Although granules as large as 5 mesh may be used, the presence of at least some portion of finer size is desirable to prevent bouncing of the mixture when impinged against a vertical wall. Also, the carbonaceous granules may comprise various ranges of sizes as in the case of the dead-burned particles. For example, one combination may comprise by weight 23 percent of minus 14 to plus 20 mesh, 49 percent of minus 20 to plus 100 mesh, and 28 percent of fines passing 100 mesh. Many other sizings easily available are also usable for the present gunning refractory mix. The pitch preferably is sufficiently hard to be grindable without caking while being reduced in size by grinding, or while being mixed into the gunning refractory batch.

The proportions of the components of the present refractory mix are not critical. The dead-burned particles, of course, define the greatest portion by weight, the chemical bonding material, the plasticizing gel-forming agent, and the carbonaceous material being used in amounts necessary to perform their described functions, as easily determined by trial and error. Generally, a refractory mix of the present invention comprises in weight percent about 80 percent to about 95 percent of the dead-burned particles, about 2 percent to about 6 percent of the chemical bonding material, about 0.05 to about 4 percent of the plasticizing gel-forming agent where used, and about 3 percent to about 10 percent of the carbonaceous granules.

The refractory mix of whatever formulation is tempered with water and then applied to a damaged area of a surface such as a lining as by pneumaticaly discharging the mix by compressed air through a tubular pipe or nozzle. The dry mixture may also be tempered with a water spray as the mixture passes through a discharge nozzle similar to that described in the cited U.S. Patent No. 2,671,692. The tempered material may also be shoveled into place.

In order to demonstrate the invention, the following exemplary formulations are set forth for the purpose of illustration only. Any specific enumeration or detail mentioned should not be interpreted as a limitation of the invention unless specified as such in one or more of the appended claims and then only in such claim or claims.

*Example 1*

|  | Weight percent |
|---|---|
| Dead-burned dolomite, minus 6-mesh | 63.5 |
| Dead-burned magnesia clinker, minus 50 mesh | 26.0 |
| Anhydrous powdered sodium silicate, weight ratio of $Na_2O$ to $SiO_2$ of 1:3.22 | 3.8 |
| Hectorite | 1.9 |
| Pitch, softening point of 145° C. | 4.8 |

*Example 2*

| Dead-burned dolomite, minus 6 mesh | 57.5 |
|---|---|
| Dead-burned magnesia clinker, minus 50 mesh | 28.7 |
| Hydrated sodium silicate, weight ratio of $Na_2O$ to $SiO_2$ of 1:3.22 | 4.6 |
| Hectorite | 1.8 |
| Pitch, softening point in the range of 100° C. to 105° C. | 7.4 |

*Example 3*

| Dead-burned magnesite, minus 14 mesh | 85.3 |
|---|---|
| Anhydrous sodium silicate, weight ratio of $Na_2O$ to $SiO_2$ of 1:3.22 | 4.6 |
| Bentonite | 1.8 |
| Pitch, softening point of 145° C | 8.3 |

*Example 4*

| Dead-burned magnesite, minus 14 mesh | 88.7 |
|---|---|
| Hydrated sodium silicate, weight ratio of $Na_2O$ to $SiO_2$ of 1:2.40 | 3.8 |
| Ball clay | 1.9 |
| Pitch, softening point in range of 80° C. to 85° C. | 5.6 |

*Example 5*

|  | Weight percent |
|---|---|
| Dead-burned dolomite, minus 12 plus 28 mesh | 61.9 |
| Dead-burned magnesia, minus 65 mesh | 27.6 |
| Anhydrous powdered sodium silicate, weight ratio of $Na_2O$ to $SiO_2$ of 1:3.22 | 3.8 |
| Hectorite | 1.9 |
| Coal tar pitch, softening point of 145° C. | 4.8 |

Other forms embodying the features of the invention may be employed, change being made as regards the features herein disclosed, provided those stated by any of the following claims or the equivalent of such features be employed.

We therefore particularly point out and distinctly claim as our invention:

1. A gunning mix consisting essentially of substantially dead-burned basic refractory particles, an alkali silicate bonding agent effective chemically to react with said basic refractory particles and bond one to another, and particles of pitch having a softening point sufficiently high to avoid softening prior to application of the mix, said pitch particle being susceptible to pyrolytic decomposition to form a carbon bond at temperatures generally higher than that at which said chemical bonding agent reacts with the refractory particles.

2. A gunning mix non-setting at temperatures normally attendant the preparation and handling of the mix and adapted to be tempered with water and used in repairing furnace linings and the like, said mix consisting essentially in admixture of: particles of a refractory selected from the group consisting of substantially dead-burned dolomite, magnesia, and mixtures thereof, a sufficient amount of an alkali silicate to react with said particles and bond them one to another, a gel-forming material to plasticize the admixture, and granules of pitch having a softening point no lower than about 80° C., said pitch softening for the first time upon application and heating of the mix at a point of use and thereby serving as a physical bond for the particles while said bonding agent so reacts, said pitch subsequently undergoing pyrolytic decomposition to form an additional bond of carbon for the particles.

3. A gunning mix non-setting at temperatures normally attendant the preparation and handling of the mix adapted to be tempered with water and used in repairing furnace linings and the like, said mix consisting essentially in admixture in weight percent of: about 80 percent to about 95 percent of particles of a refractory material selected from the group consisting of dead-burned dolomite, magnesia, and mixtures thereof, about 0.05 percent to about 4 percent of a gel-forming plasticizing agent, and a binary binder system consisting essentially of about 2 percent to about 6 percent of an alkali silicate to bond said particles together upon initial heating of the mix, and about 3 percent to about 10 percent of granules of pitch susceptible to pyrolytic decomposition upon further heating of the mix to deposit a carbon bond, said pitch having a softening point no lower than about 80° C.

4. A method of making refractory repairs comprising the steps of admixing basic refractory particles with a binary binder system consisting essentially of an alkali silicate bonding agent chemically reactive with the refractory particles, and particles of pitch having a softening point sufficiently high to avoid softening prior to application of the mix, a refractory-base to be repaired, applying the mix to said point of use, and then heating the applied mix to react chemically the bonding agent with the refractory particles and thereafter pyrolytically to decompose the pitch particles and deposit a carbon bond.

5. A method of making refractory repairs comprising the steps of admixing particles of a refractory selected from the group consisting of substantially dead-burned dolomite, magnesia, and mixtures thereof with a binary binder system consisting essentially of an alkali silicate and particles of pitch having a softening point no lower than about 80° C., tempering the mix with water, applying the tempered mix to a refractory base to be repaired, heating the applied mix to melt the pitch and temporarily physically bond the particles while the silicate chemically reacts with the particles to bond one to another, and then continuing to heat the applied mix pyrolytically to decompose the molten pitch and deposit a carbon bond.

6. A gunning mix of claim 3 wherein said dead-burned refractory materials have a mesh within the range of about minus 6 to about plus 100, U.S. standard sieve.

7. A gunning mix of claim 3 wherein said alkali silicate is selected from the group consisting of potassium silicate and sodium silicate.

8. A gunning mix of claim 3 wherein all said granules of pitch pass about 14 mesh and about 50 per cent to 65 per cent of the granules pass about 200 mesh, U.S. standard sieve.

9. A gunning mix of claim 3 wherein said granules of pitch have a softening point within the range of about 80° C. to about 150° C.

10. A gunning mix of claim 3 wherein said alkali silicate is sodium silicate containing a weight ratio of $Na_2O$ to $SiO_2$ within the range of about 1:2 to about 1:3.5.

11. A gunning mix of claim 3 further including sufficient water to temper the admixture for application to a point of use.

References Cited by the Examiner
UNITED STATES PATENTS

| | | | |
|---|---|---|---|
| 2,943,240 | 1/60 | Martinet | 106—58 |
| 3,047,411 | 7/62 | Chantler et al. | 106—58 |

TOBIAS E. LEVOW, *Primary Examiner.*

JOHN H. MACK, *Examiner.*